United States Patent
Smith

(10) Patent No.: US 6,970,194 B1
(45) Date of Patent: Nov. 29, 2005

(54) DEFECT CORRECTION IN ELECTRONIC IMAGING SYSTEMS

(75) Inventor: Stewart Gresty Smith, Edinburgh (GB)

(73) Assignee: STMicroelectronics Limited, Buckinghamshire (GB)

( * ) Notice: Subject to any disclaimer, the term of this patent is extended or adjusted under 35 U.S.C. 154(b) by 0 days.

(21) Appl. No.: 09/441,709

(22) Filed: Nov. 16, 1999

(30) Foreign Application Priority Data

Nov. 17, 1998 (GB) .................................. 9825086

(51) Int. Cl.$^7$ ............................................. H04N 9/64
(52) U.S. Cl. ...................... 348/247; 348/246; 382/260; 250/559.04
(58) Field of Search ................................ 348/246, 247, 348/241; 382/141, 149, 272, 205, 275, 260; 250/559.04

(56) References Cited

U.S. PATENT DOCUMENTS

| | | | |
|---|---|---|---|
| 4,541,116 A | | 9/1985 | Lougheed .................... 382/49 |
| 4,833,723 A | | 5/1989 | Loveridge et al. ............ 382/52 |
| 4,977,521 A | * | 12/1990 | Kaplan ........................ 382/254 |
| 5,113,246 A | * | 5/1992 | Ninomiya et al. ........... 348/234 |
| 5,381,175 A | | 1/1995 | Sudo et al. .................. 348/246 |
| 5,392,070 A | | 2/1995 | Endo et al. .................. 348/247 |
| 5,748,803 A | | 5/1998 | Schielke ..................... 382/275 |
| 5,854,655 A | * | 12/1998 | Watanabe et al. ............ 348/247 |
| 5,917,957 A | * | 6/1999 | Ichikawa .................... 382/274 |
| 5,970,115 A | | 10/1999 | Colbeth et al. ............... 378/62 |
| 6,163,619 A | * | 12/2000 | Maruo ........................ 382/141 |
| 6,529,238 B1 | * | 3/2003 | Mahant-Shetti et al. .... 348/246 |

FOREIGN PATENT DOCUMENTS

| | | | | |
|---|---|---|---|---|
| EP | 0 440 563 | 1/1991 | .......... | H04N 5/217 |
| EP | 0 496 573 | 1/1992 | .......... | H04N 5/217 |
| EP | 0717560 | 6/1996 | .......... | H04N 5/217 |
| WO | 95/27367 | 10/1995 | .......... | H04N 5/217 |

OTHER PUBLICATIONS

"The Image Processing Handbook" IEEE Order No. PC5592, Second Edition, 2516, ISBN 0-8493-2516-1.
"The Image Processing Handbook" IEEE Order No. PC5592, Second Edition, 2516, ISBN 0-8493-2516-1.

\* cited by examiner

*Primary Examiner*—David L. Ometz
*Assistant Examiner*—Gevell Selby
(74) *Attorney, Agent, or Firm*—Lisa K. Jorgenson; Allen, Dyer, Doppelt, Milbrath & Gilchrist, P.A.

(57) ABSTRACT

A method for processing a video data stream including a series of pixel values corresponding to pixel sites in an electronic imaging device includes the step of filtering the video data stream in real time to correct or modify defective pixel values based on a plurality of neighboring pixel values. The filtering of each pixel value uses a current pixel value as part of a data set including the neighboring pixel values in determining whether and/or how to correct or modify the current pixel value. The pixel values which are most severely defective are identified and stored. A first filtering algorithm is applied to those pixels whose locations are not stored, and a second filtering algorithm is applied to the most severely defective pixels whose locations have been stored. The filtering algorithm includes sorting the current pixel value and the neighboring pixel values into a rank order and modifying the current pixel value on the basis of its place in the rank order.

20 Claims, 3 Drawing Sheets

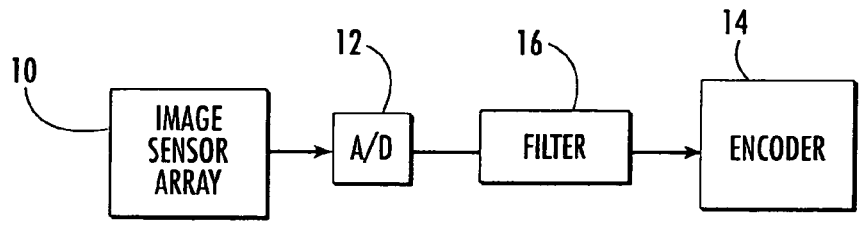
FIG. 1
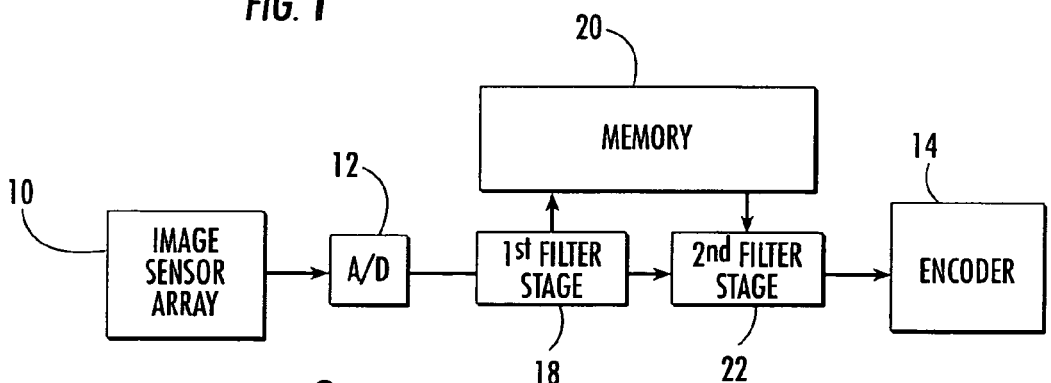
FIG. 2
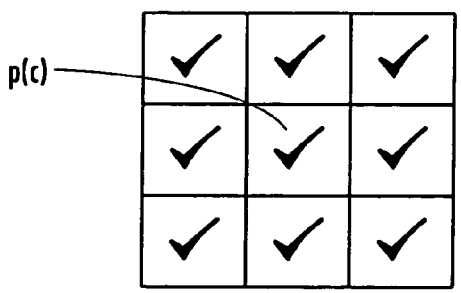 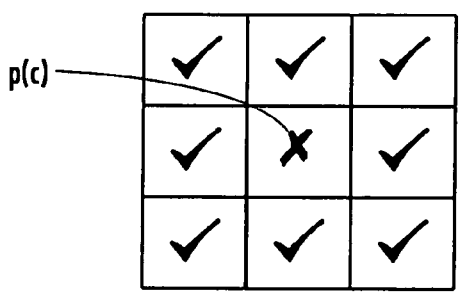
FIG. 3a          FIG. 3b

DEFECT CORRECTION IN ELECTRONIC IMAGING SYSTEMS

FIELD OF THE INVENTION

The present invention relates to electronic imaging systems, and, more particularly, to a method and apparatus for correcting defects in video data generated by an electronic imaging system.

BACKGROUND OF THE INVENTION

A majority of electronic imaging devices are now implemented using semiconductor technologies. Examples include the charge coupled display (CCD), which is implemented using a MOS manufacturing process, and, more recently, image sensors manufactured using standard CMOS semiconductor processes. In all of these cases, the sensor normally includes a one or two dimensional array of discrete pixels. As a result of the manufacturing processes employed in the production of such devices, occasional defects occur at individual pixel sites. Such defects may cause the affected pixel to be brighter or darker than the true image at that point, including the extreme cases of saturated white or black pixels.

These defects affect some proportion of the plurality of individual imaging devices or chips on each manufactured wafer. The chips affected must normally be rejected unless the defects can be masked or corrected. It is more economical to mask or correct defective pixels, thus enabling otherwise rejected chips to be passed. This improves the apparent yield of good imaging chips per wafer, and, thereby lowers the cost per usable chip. It is known in the art to calibrate imaging devices at the point of camera manufacture so that the locations of defective pixels in the imaging array are identified and stored. In subsequent use of the device, pixel data from these locations are masked or corrected in the live video data stream.

One simple and well known masking technique is to substitute the defective data with a copy of the value of a neighboring or adjacent pixel. More sophisticated techniques are also possible, and typically may produce an estimate of the correct value of the defective pixel data. This is done by applying an algorithm to the data obtained from the neighboring pixels in one or two dimensions. Generally, the best correction filters use a mixture of linear and non-linear estimators and work on at least a 3×3 pixel neighborhood centered on the defective pixel.

This prior technique of calibrating individual sensors at the point of manufacture has two main disadvantages. First, and most significantly, the process of calibrating the sensor to determine defect locations is an inconvenient and expensive manufacturing burden. Second, defects may sometimes be transient in nature, so that defects present and corrected for at the time of calibration may subsequently disappear, or worse, new defects may occur subsequent to calibration. These latter defects will remain uncorrected in subsequent camera use and will result in blemishes on the images output by the camera.

SUMMARY OF THE INVENTION

The invention is most particularly concerned with the correction of defects arising from defective pixel sites in electronic image sensors, and is also applicable to a more general noise reduction in video data streams. The invention is equally applicable to monochrome and color video data and may be useful in still imaging systems as well as kinematic video systems.

A first object of the present invention is to provide a method and an apparatus for the correction of defects in an electronic imaging system which prevents or reduces the above mentioned disadvantages of prior art image defect correction schemes.

While the invention may be implemented using known error correction algorithms for correcting the pixel values output by defective pixel sites, it is a further object of the present invention to provide an improved method and apparatus for filtering video data signals, both for the purpose of correcting image defects originating from defective pixel sites and for more general noise reduction purposes.

BRIEF DESCRIPTION OF THE DRAWINGS

Embodiments of the invention will now be described, by way of example only, with reference to the accompanying drawings, in which:

FIG. 1 is a block diagram illustrating a first embodiment according to the present invention;

FIG. 2 is a block diagram illustrating a preferred embodiment according to the present invention;

FIGS. 3(a) and 3(b) are illustrations representing pixel neighborhood locations used in correcting image defects according to the present invention;

DETAILED DESCRIPTION OF THE PREFERRED EMBODIMENTS

Figure 4:
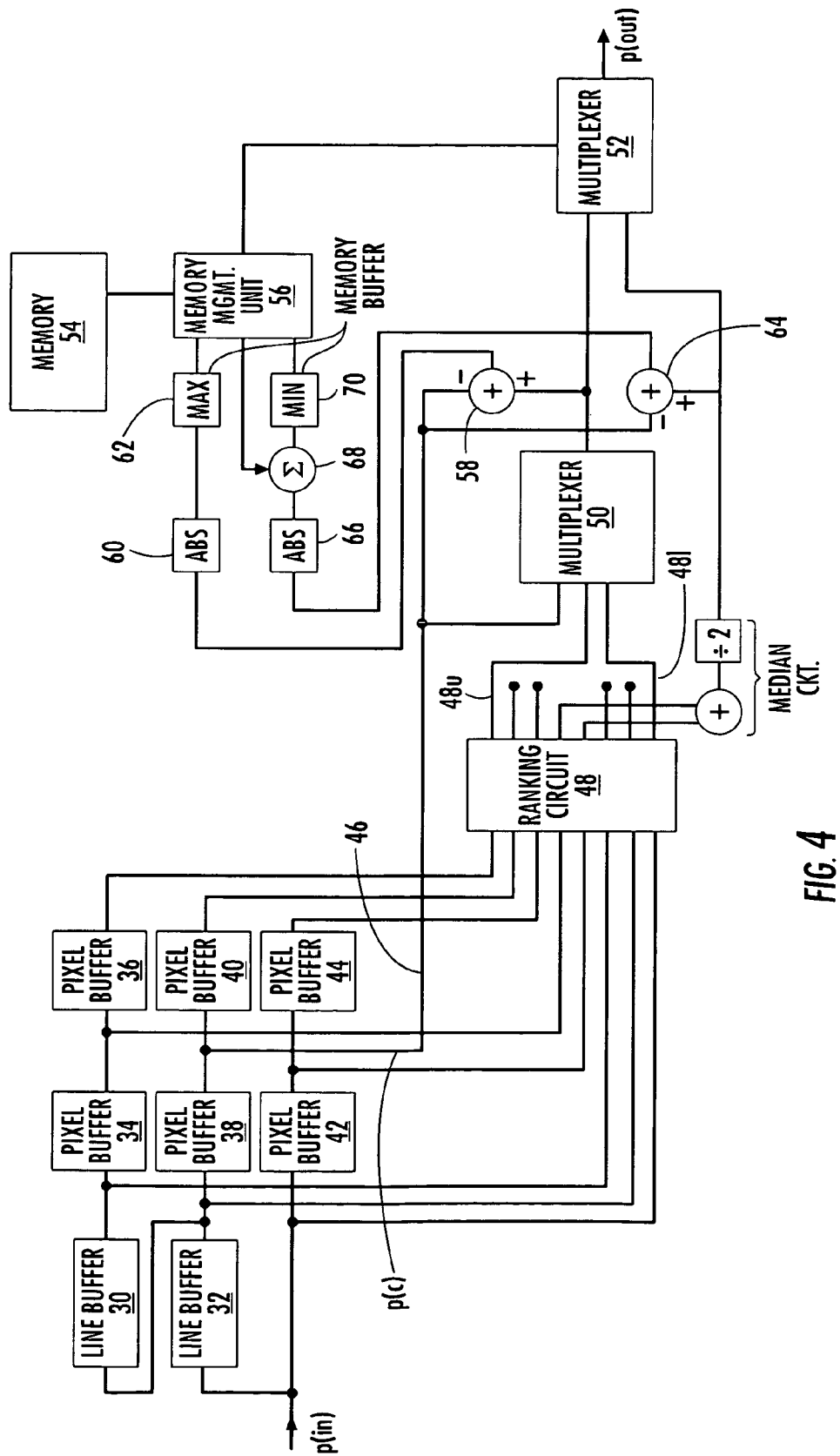
FIG. 4 is a more detailed block diagram according to the present invention using the pixel neighborhood location representations illustrated in FIG. 3.

Referring now to the drawings, FIG. 1 illustrates a first, most general embodiment of the invention. An image sensor 10 of a known type comprises an array of pixels. The sensor array 10 outputs an analog data stream which is converted to digital form by analog to digital conversion means 12 or converter. Assuming a two dimensional pixel array, the data stream comprises a series of pixel values output line by line from the sensor 10. The digital data stream would normally be encoded by encoding means 14 or an encoder in a manner to suit the intended end use of the video data.

In accordance with the present invention, the live video data stream is filtered in real time by digital filter means 16 or a filter to correct or mask anomalous pixel values which are judged to arise from defective pixel sites in the sensor 10. Typically, the filter 16 judges a pixel value to be defective if it is significantly higher or lower than its neighbors or adjacent pixels in either one or two dimensions. The filter replaces the defective pixel value with a substitute value. The substitute value may be derived by any suitable algorithm, which may involve linear and/or non-linear processes which may operate on surrounding pixel data from a one or two dimensional neighborhood surrounding the defective pixel value.

The filter 16 works permanently on the normal sensor output and does not require the use of any reference scene or predetermined calibration data. Rather, the filter depends on predetermined criteria for identifying defective pixel values in the live data stream and on predetermined rules for deriving substitute pixel values to replace the defective pixel values.

This live or in-line correction of defective pixels overcomes the manufacturing burden of prior art techniques and deals automatically with defects which arise after manufacture. It further provides a degree of noise filtering on noisy images, correcting excessively large single-pixel noise spikes. Applying automatic correction in this way to an entire image can, in some circumstances, cause an undesirable deterioration in the overall image quality unless the parameters of the correction filter are relaxed. This limits the effectiveness of the technique in its most basic form.

A suitable class of a pixel-correcting filter is one which uses the central pixel data itself as part of the data set used to determine the correction to be applied. Typically, this means that the non-defective portions of the image, i.e., the majority of each image, are unaffected by the presence of the correcting filter. The filter will, however, correct defects of large magnitude.

Unfortunately, many defects which would be desirable to correct are not of large magnitude. Typical examples are pixels with a significant gain error, or pixels which are stuck at an intermediate image value. A single filter capable of correcting these more subtle defects while not falsely correcting non-defective pixels causing an undesirable effect on the overall image, such as by producing a smearing effect, has not been developed.

FIG. 2 illustrates a preferred embodiment of the invention, in which the single filter 16 of FIG. 1 is replaced by first and second filter stages 18 and 22 and a defect memory or database 20. In accordance with this scheme, the first filter stage 18 performs two functions. First, it applies a more subtle correction algorithm to the complete data stream to correct defects of lower magnitude as noted above. Second, it identifies pixels exhibiting more extreme defects, and passes information regarding these pixels to the defect memory 20. The defect memory 20 stores information regarding those pixels which are judged to be most severely defective. The defect memory 20 controls the operation of the second filter stage 22, which applies more severe correction selectively to those pixels identified in the defect memory 20.

Typically, the number of pixels for which severe correction is required will be less than 1% of the total pixel count. The pixel locations stored in the defect memory 20 are restricted to those that, historically, appear to be most severely in error as detected by the first filter stage 18. That is, for each video frame or for each still image captured by the sensor, all defects are monitored by the first filter stage 18. Those pixel locations exhibiting the largest apparent errors are added to the defect memory 20 if not already identified and stored.

To enable the contents of the defect memory 20 to remain dynamic over time, a management strategy is required so that locations representing transient noise defects or defects which disappear over time can be identified and removed from the defect memory 20. Besides preventing future correction of non-defective pixel values, this also creates memory space for new or previously undetected defects. The memory space 20 is necessarily limited, and it is desirable that it be as small as possible consistent with the number of defects which are likely to be encountered in practice. Typically, the defect memory 20 might store less than 1% of all possible pixel locations. Accordingly, no more than 1% of pixels will be subject to severe correction. This proportion is so low as to be unnoticeable to a human observer of the corrected video or still image.

A preferred embodiment of the scheme illustrated in FIG. 2 will now be described with reference to FIGS. 4 and 5.

Referring first to FIGS. 3(a) and 3(b), these illustrate examples of pixel neighborhoods operated on by digital filters of the type employed in the invention. In a two dimensional pixel array, each pixel is surrounded by eight immediately neighboring pixels forming a 3×3 array. The pixels at the edges of the array are neglected.

The particular pixel operated on by a filter at any point in time is the central pixel p(c) of the 3×3 array. FIG. 3(a) illustrates the situation when the filter includes the central pixel value along with the values of the surrounding eight pixels in the data set employed to determine a substitute value for p(c). FIG. 3(b) illustrates the situation when the filter excludes the central pixel value from the data set employed to determine a substitute value for p(c). These two alternatives are both employed in the two stage filtering provided by the preferred embodiments of the present invention, as described in greater detail below. It will be understood that the use of a 3×3 array for the filter data set is merely an example being particularly applicable to monochrome image sensors. Larger and/or differently oriented arrays may be appropriate in some circumstances, particularly for color sensors. The approach described in the present example can clearly be extended to other shapes or other array sizes.

Referring now to FIG. 4, there is shown a block diagram of a video data filtering system corresponding to blocks 18, 20 and 22 of FIG. 2. The input data stream includes a series of input pixel values p(in), and the output data stream includes a series of output pixel values p(out).

The input data stream is first sampled by a sampling network comprising line memory buffers 30 and 32, each of which is capable of storing a complete line of video data. The input data stream is also sampled by individual pixel value memory buffers 34, 36, 38, 40, 42 and 44. The incoming video signal is routed through the line buffers 30, 32 and into the pixel buffers 34–44 so that, over a number of clock cycles, nine pixel values for the central pixel p(c) and surrounding neighbors are accumulated to be operated on by the filter system. The line buffers 30, 32 suitably comprise random access memory, while the pixel buffers 34–44 may be D-type flip-flops.

The central pixel value p(c) is extracted on line 46 as shown, while the eight neighboring values are applied to block 48. Block 48 sorts the values of the neighboring pixels into rank order according to their amplitudes. Block 48 also outputs the values in rank order, with the highest value output on the upper output line 48U and the lowest value on the lower output line 48L. In this example, the filter system only employs the highest, lowest and middle two ranking values out of the eight input values. However, variations on this example could utilize other combinations of the eight ranked values, as shall be discussed below.

The ranked values of the neighboring pixels are employed by both the first and second stage filter processes 18 and 22 of FIG. 2. The two filter stages share components and functions of the embodiment illustrated in FIG. 4, rather than being discrete systems as shown in FIG. 2. However, their essential functionality is separate and is in accordance with the schematic representation provided by FIG. 2. The first stage filtering operates to apply relatively subtle correction to the entire data stream while at the same time identifying defect locations to which the second stage filtering is to be applied, as follows.

The highest and lowest ranked pixel values on lines 48U and 48L and the central pixel value p(c) on line 46 are input to block 50, which operates as a three to one multiplexer. Block 50 compares p(c) with the highest and lowest ranked values. If the value of p(c) is greater than the highest ranked value, then the highest ranked value is output from block 50, replacing p(c) in the data stream. If the value of p(c) is less than the lowest ranked value, then the lowest ranked value is output from block 50, replacing p(c) in the data stream. If the value of p(c) is less than the highest ranked value and greater than the lowest ranked value, or is equal to either value, then the value of p(c) is output from block 50 so that p(c) is unaffected by the first stage filter.

Figure 5:
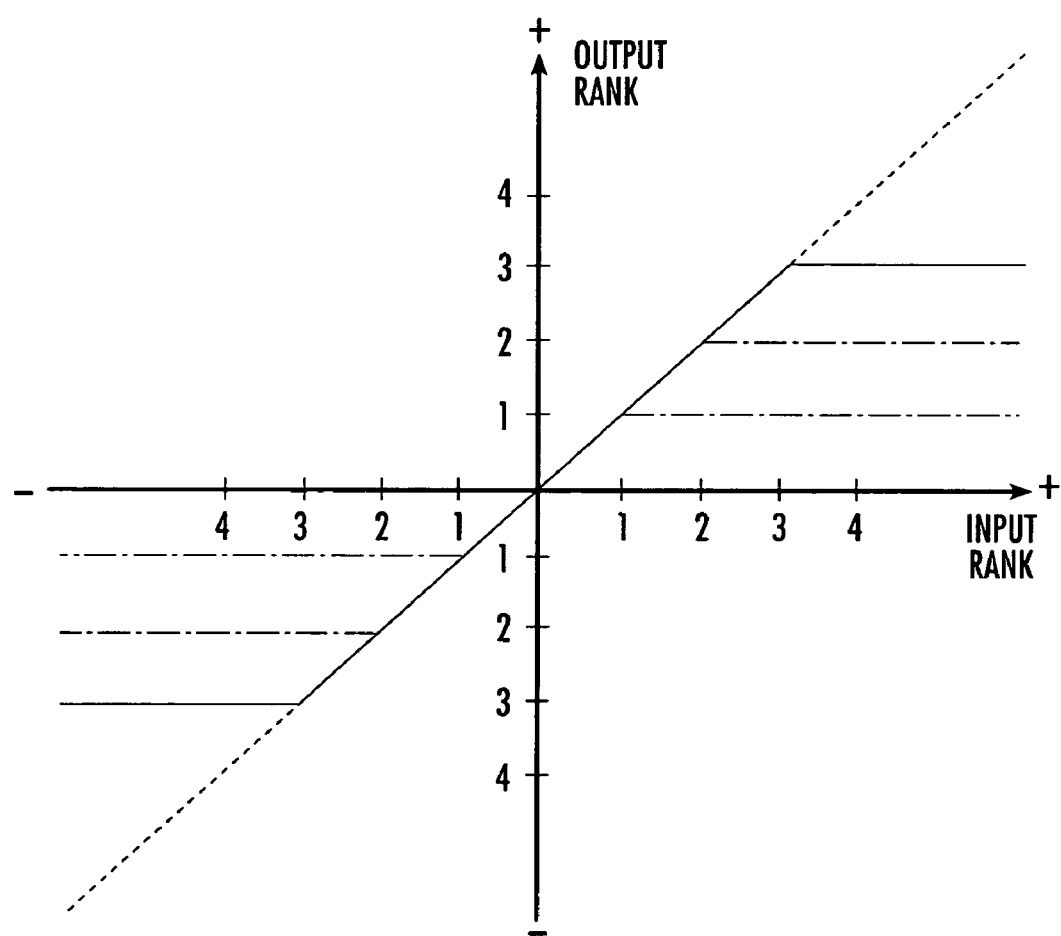
FIG. 5 is a graph illustrating operation of a digital filter used in the embodiment illustrated in FIG. 4.

This filtering scheme is illustrated in FIG. 5, in which the rank of the input pixel value is plotted against the rank of the pixel value which is output by the filter. The nine ranks of this example are numbered from −4 to +4, with zero being the rank of the median pixel value. The graph shown corresponds to the scheme described above. If p(c) is ranked +4 then it is replaced by the value of rank +3. If p(c) is ranked −4 it is replaced by the value of rank −3. Otherwise, it is unaffected by the filter.

The filter could be modified to allow maximum values restricted to ranks 1 or 2, as indicated by the dot-and-dash lines, in which case different outputs from block 48 would be employed. The filter could also be made to be switchable between these different modes of operation if required. The horizontal axis of FIG. 5 corresponds to a median filter, in which the median value is output regardless of the input value. The diagonal line through the origin indicated by the dashed line corresponds to zero filtering, in which the output is always equal to the input.

Since this filtering operation is applied to the entire data stream, it acts as a general noise reduction filter as well as correcting relatively subtle defects arising from defective pixel sites in the sensor array. It is potentially useful in applications other than that illustrated in FIGS. 2 and 4. For example, it could be employed purely as a noise reduction filter in imaging systems using prior art calibration schemes to correct sensor defects. This filtering scheme will be referred to hereinafter as a scythe filter and its output value as the scythe value, or may simply be referred to as the filter and filter value.

The second stage filtering 22 of FIG. 2, in this example, is based on the median value of the pixels neighboring the central pixel p(c). A conventional median filter applied to a 3×3 array would output a value corresponding to the median value of the nine pixels in the array. In the present case, it is preferred to neglect the value of the central pixel, since this has already been presumed to be erroneous when the second stage filtering is applied. Accordingly, a median value is calculated based on the values of the eight neighboring pixels, excluding the central pixel p(c) as shown in FIG. 3(*b*). Since there is an even number of neighboring pixels, the median value used is the mean value of the two middle ranking pixel values. The sorting of the neighboring pixel values into rank order, described above, facilitates this. As seen in FIG. 5, the values of the two middle ranking values output from block 48 are summed and divided by two to provide a pseudo-median value. This filtering scheme will be referred to hereinafter as a ring median filter and its output as the median value.

In the example of FIG. 4, it can be seen that scythe (first stage) filtering and ring median (second stage filtering) both take place in parallel on the entire data stream. Both the scythe and median values are input to a final two to one multiplexer 52. The final output p(out) is determined by the contents of the defect memory 20 of FIG. 2. If the pixel location corresponding to the central pixel p(c) is stored in the defect memory 20, then multiplexer 52 will select the ring median value as the final output value. Otherwise, the final output value will be the scythe value. Since the pixel locations stored in the defect memory 20 comprise only a small proportion of the total number of pixels in the sensor array, scythe filtering will be applied to the majority of the data stream with ring median filtering being applied to the remainder.

In FIG. 4, the defect memory 20 of FIG. 2 is represented by memory block 54 and memory management block 56. The pixel locations stored in the defect memory 20 are those which exhibit the most extreme differences from their neighbors. In the embodiment of FIG. 4, pixel locations are selected for inclusion in the defect memory on the basis of the magnitude of the difference between the value of p(c) and the scythe value output from block 50. The difference between the two values is determined at 58 and the absolute magnitude of this difference at 60. The decision as to whether a particular pixel location should be stored can be based on a wide variety of criteria. This criteria is dependent in part on the size of the defect memory and on the memory management strategy employed.

In the present example, a simple scheme is employed whereby the single worst defect in each video frame is stored in the defect memory. This defect is the greatest difference between the value of p(c) and the scythe value. For each frame, the worst defect to date is stored in buffer memory 62. At the end of the frame, the value stored at 62 is passed to the memory block 54, together with its corresponding location in the sensor array. The data stored in the memory block 54 is essentially a sorted list of pixel locations and associated defect magnitudes. Additional information could be stored if necessary.

It will be understood that the beginnings and endings of video frames and the locations of pixels corresponding to pixel values in the data stream can be derived by the use of clocks, counters and information included in the data stream. This may be done in a manner which will be familiar to those skilled in the art. Systems for performing these functions will not be described herein and are excluded from the drawings for the sake of clarity.

The memory management unit 56 controls the output multiplexer 52 to select the ring median value as the final output when the current pixel corresponds to a location stored in the memory block 54. Otherwise, the scythe value is selected. As noted above, a strategy is required for managing the contents of the memory block 54. This is accomplished in the present example by means of a first-order auto-regression function also known as leaky integration. That is, the magnitudes of the defects stored in the memory are continually updated by means of the auto-regression formula. Once the memory 54 is full, the locations with lowest defect magnitudes can be replaced by newly detected defects of greater magnitude. The magnitudes of persistent defects will be refreshed by normal operation of the filtering system, while the stored magnitudes of transient defects will gradually attenuate until they are replaced.

In this example, the magnitudes of stored defects are updated by determining the difference between the current pixel value p(c) and the ring median value at 64, and the absolute magnitude of this difference at 66. The updated value is calculated using the auto-regression formula at 68 from the current stored value for the relevant pixel location and magnitude of the difference between p(c) and the ring median value. The stored value is updated accordingly. The location of the current, lowest stored value is stored in memory buffer 70 so that this value (MIN) can be replaced by a new defect location and value (MAX 62) once the memory 54 is full.

FIG. 2 represents a generalized version of the preferred embodiment, employing a stored list of defect locations to apply two stage filtering to an incoming data stream. The first stage filtering also serves to determine which locations are stored. The second stage filtering is switched on and off on the basis of the stored list. As seen in FIG. 4, this functionality is implemented by applying both filtering functions in parallel and selecting which filter output to use on the basis of the stored list. The first stage filter output is also being employed in the selection of locations for storage, and the second stage filter output is being employed in the management of the stored list.

Other variations of the described embodiments can be envisioned using different filtering functions, different data sampling schemes and different memory management strategies. Such variations and other modifications and improvements may be incorporated without departing from the scope of the invention.

What is claimed is:

1. A method for processing a video data stream in an electronic imaging system comprising a memory, said video data stream comprising a series of pixel values corresponding to pixel sites in the electronic imaging system, the method comprising:
   filtering the video data stream in real time for correcting/modifying defective pixel values, the filtering comprising
      filtering pixel values not stored in the memory using a first filtering algorithm,
      identifying defective pixel values,
      storing locations of the defective pixel values in the memory, and
      filtering the defective pixel values stored in the memory using a second filtering algorithm.

2. A method according to claim 1, wherein the filtering comprises filtering each pixel value based on a plurality of adjacent pixel values.

3. A method according to claim 2, wherein the filtering comprises filtering each pixel value using a current pixel value as part of a data set including the plurality of adjacent pixel values for determining whether to correct/modify the current pixel value and how to correct/modify the current pixel value.

4. A method according to claim 1, wherein the filtering of each pixel value is based on a plurality of adjacent pixel values; the first filtering algorithm using a current pixel value as part of a data set including the plurality of adjacent pixel values.

5. A method according to claim 4, wherein the first filtering algorithm implements the following:
   sorting the current pixel value and the plurality of adjacent pixel values into a rank order based upon predetermined criteria; and
   modifying the current pixel value with respect to its rank in the rank order.

6. A method according to claim 5, wherein the current pixel value is modified if its rank is greater than a predetermined maximum rank value or less than a predetermined minimum rank value.

7. A method according to claim 6, further comprising:
   replacing the current pixel value by a pixel value having the predetermined maximum rank value if the rank of the current pixel value is greater than the predetermined maximum rank value;
   replacing the current pixel value by a pixel value having the predetermined minimum rank value if the rank of the current pixel value is less than the predetermined minimum rank value; and
   leaving the current pixel value unchanged if the current pixel value has a rank less than the predetermined maximum rank value and greater than the predetermined minimum rank value.

8. A method according to claim 7, wherein the predetermined maximum rank value is a highest ranking of the plurality of adjacent pixel values, and the predetermined minimum rank value is a lowest ranking of the plurality of adjacent pixel values.

9. A method according to claim 1, wherein storing locations of the defective pixel values is based upon an output of the first filtering algorithm.

10. A method according to claim 9, wherein a pixel value is determined to be defective based on a magnitude of a difference between a current pixel value and a pixel value corresponding to the output of the first filtering algorithm.

11. A method according to claim 10, wherein location of at least one pixel value having a greatest difference in magnitude from the output of the first filtering algorithm is stored in the memory for each frame of video data.

12. A method according to claim 1, wherein the filtering of each pixel value is based on the plurality of adjacent pixel values; and the second filtering algorithm excludes a current pixel value from a data set including the plurality of adjacent pixel values.

13. A method according to claim 12, wherein the second filtering algorithm replaces the current pixel value with a median value of the plurality of adjacent pixel values.

14. A method according to claim 1, wherein the storing comprises storing a defect value corresponding to a magnitude of the defect exhibited by each defective pixel value.

15. A method according to claim 14, further comprising updating contents of the memory using a predetermined memory management algorithm.

16. A method according to claim 15, further comprising updating the defect value of each defective pixel value based upon an auto-regression function applied to a current pixel value of each defective pixel location stored in the memory, a current output from the second filtering algorithm and a current stored defect value.

17. A method according to claim 1, wherein the first and second filtering algorithms are applied to the video data stream in parallel, and a final output pixel value is selected from outputs of the first and second filtering algorithms depending on whether a corresponding pixel location is stored in the memory.

18. An apparatus for processing a video data stream comprising:
   an electronic imaging device;
   a first filter circuit connected to said electronic imaging device for filtering the video data stream in real time for correcting/modifying defective pixel values, the video data stream comprising a series of pixel values corresponding to pixel sites in said electronic imaging device;
   a sampling circuit connected to said first filter circuit for sampling the video data stream to obtain a data set comprising a current pixel value and a plurality of adjacent pixel values;
   a ranking circuit connected to said sampling circuit for sorting the plurality of adjacent pixel values into a rank order based upon predetermined criteria;
   a comparator connected to said ranking circuit for comparing a current pixel value with the plurality of adjacent pixel values of selected ranks, and for generating a first filter output based upon the comparison; and
   a median circuit connected to said ranking circuit for determining a median value of the plurality of adjacent pixel values and for generating a second filter output equal to the median value.

19. An apparatus according to claim 18, further comprising a memory connected to said comparator for storing pixel locations selected based upon the first filter output.

20. An apparatus according to claim 19, further comprising an output circuit connected to said median circuit, said ranking circuit and said memory for generating a final output pixel value selected from the first and second filter outputs based upon contents of said memory.

* * * * *